(12) United States Patent
Akenine-Moller et al.

(10) Patent No.: US 9,552,620 B2
(45) Date of Patent: Jan. 24, 2017

(54) DEPTH OFFSET COMPRESSION

(71) Applicant: Intel Corporation, Santa Clara, CA (US)

(72) Inventors: Tomas G. Akenine-Moller, Lund (SE); Magnus Andersson, Helsingborg (SE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/318,986

(22) Filed: Jun. 30, 2014

(65) Prior Publication Data
US 2015/0379681 A1 Dec. 31, 2015

(51) Int. Cl.
G06T 9/00 (2006.01)
G06T 1/60 (2006.01)
H04N 19/136 (2014.01)
G06T 11/40 (2006.01)

(52) U.S. Cl.
CPC ............... G06T 1/60 (2013.01); G06T 11/40 (2013.01); H04N 19/136 (2014.11)

(58) Field of Classification Search
None
See application file for complete search history.

(56) References Cited

U.S. PATENT DOCUMENTS

| 8,923,389 | B1* | 12/2014 | Hoang | H04N 19/184 375/240.02 |
|---|---|---|---|---|
| 2003/0038803 | A1 | 2/2003 | Morein | |
| 2010/0254621 | A1 | 10/2010 | Wennersten | |
| 2013/0265305 | A1 | 10/2013 | Hasselgren | |
| 2014/0085300 | A1 | 3/2014 | Andersson | |
| 2014/0139524 | A1 | 5/2014 | Nilsson | |
| 2014/0313211 | A1* | 10/2014 | Akenine-Moller | G06T 1/60 345/531 |
| 2015/0015594 | A1* | 1/2015 | Lum | G06T 1/60 345/561 |

OTHER PUBLICATIONS

Hasselgren, J., et al., "A Compressed Depth Cache," High Performance Graphics (2012) (6 pages).
Hasselgren, J., et al., "Efficient Depth Buffer Compression," SIGGRAPH/Eurographics Conference on Graphics Hardware: Proceedings of the 21st ACM SIGGRAPH/Eurographics symposium on Graphics hardware: Vienna, Austria. vol. 3. No. 04. 2006 (8 pages).
Rasmusson, J., et al., "Exact and Error-bounded Approximate Color Buffer Compression and Decompression," Graphics Hardware (2007), (9 pages).
PCT International Search Report and Written Opinion dated Oct. 12, 2015 in application No. PCT/US2015/037592 (13 pages).

* cited by examiner

Primary Examiner — Peter Hoang
(74) Attorney, Agent, or Firm — Trop Pruner & Hu, P.C.

(57) ABSTRACT

Zmin and Zmax are determined for depth offset compression. Then a check determines whether Zmin is equal to Zmax. If so, only one of Zmin and Zmax is used for depth offset compression and no index mask may be used. The bits that are saved thereby may be used for other purposes, including improving precision.

37 Claims, 6 Drawing Sheets

DEPTH OFFSET COMPRESSION

BACKGROUND

Compression methods are becoming increasingly important for graphics hardware architectures, since they may reduce the power used and increase performance. Compression of depth can be done in a variety of ways.

Depth offset (DO) compression is an extremely simple method for compressing depth. A tile, which is a rectangular region of depths, is compressed at a time. The minimum and maximum depths, denoted Zmin and Zmax, are found in the tile. For each depth value, one bit is stored which indicates whether the depth is encoded with respect to the Zmin or Zmax. For each depth, a residual against Zmin or Zmax is then stored.

If all the compressed residuals are small enough so they fit within the desired bit budget for the tile, then compression succeeds. Otherwise, the data may be stored in uncompressed form, or compressed using some other method.

Better compression is always desired because it can help to lower power consumption and/or may increase performance. Bandwidth can be significantly lowered when a large percentage of tiles can be compressed, and/or if a few tiles can be compressed with a high compression ratio.

BRIEF DESCRIPTION OF THE DRAWINGS

Some embodiments are described with respect to the following figures.

DETAILED DESCRIPTION

Figure 1:
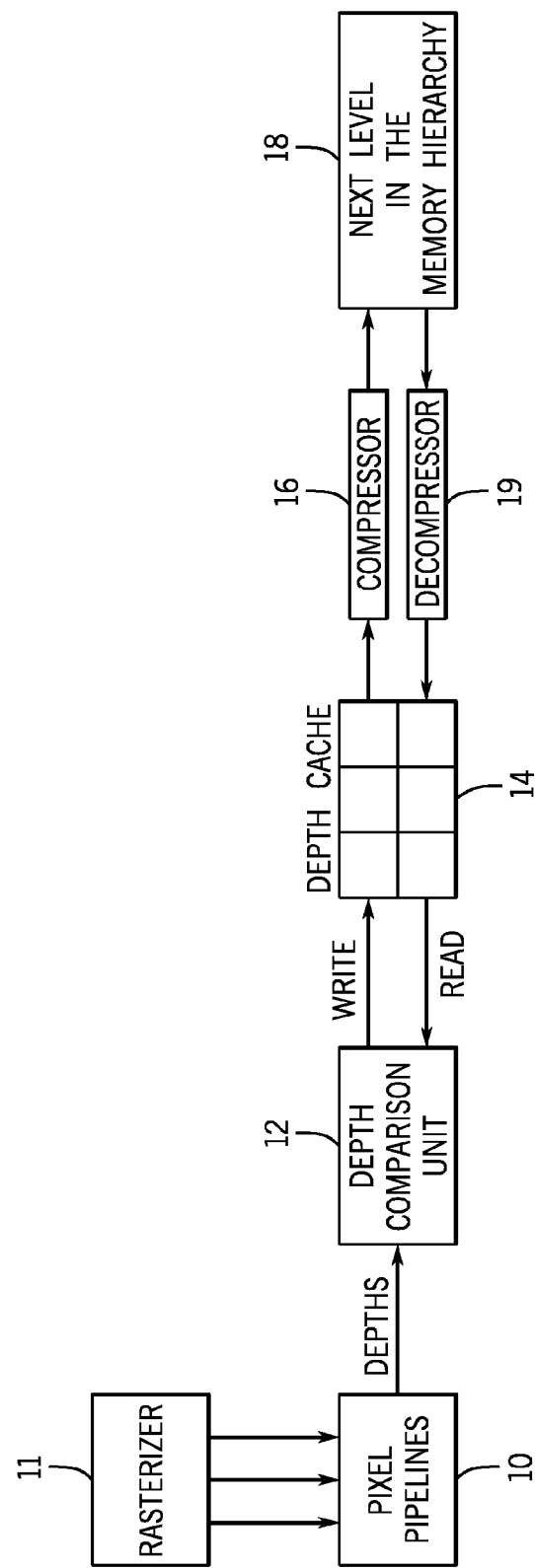
FIG. 1 shows a compressed depth architecture according to one embodiment.

"Meaningless" combinations that are present in the DO compression scheme may be exploited to achieve better compression. Zmin and Zmax describe reference points from where positive and (implicitly) negative residuals are encoded, respectively. Assume that b bits are used for each of Zmin and Zmax, and k residual bits per depth. With this layout there are redundant ways to represent the same depth value since the ranges of Zmin and Zmax may overlap. Furthermore, Zmin must always be less than Zmax. In general, as long as $Zmin+2^k>Zmax-2^k$, the same depth may be encoded both relative to Zmin and to Zmax.

The number of valid combinations of Zmin and Zmax therefore becomes $(2^b-2^k-1)^2/2$, while the allocated number of combinations usually found in DO is $2^b$. This means that at least half of the combinations are unused.

As an example, the percentage of redundant combinations for a 24 bit depth buffer for a few different b and k values are as follows:

| | b | | | | |
|---|---|---|---|---|---|
| k | 24 | 22 | 20 | 18 | 16 |
| 20 | 56.1 | 71.9 | | | |
| 19 | 53.1 | 61.7 | 87.5 | | |
| 18 | 51.6 | 56.1 | 71.9 | | |
| 17 | 50.8 | 53.1 | 61.7 | 87.5 | |
| 16 | 50.4 | 51.6 | 56.1 | 71.9 | |
| 15 | 50.2 | 50.8 | 53.1 | 61.7 | 87.5 |
| 14 | 50.1 | 50.4 | 51.6 | 56.1 | 71.9 |
| 13 | 50.0 | 50.2 | 50.8 | 53.1 | 61.7 |
| 12 | 50.0 | 50.1 | 50.4 | 51.6 | 56.1 |

The redundancies described above can be used to improve compression. For example, assume that Zmin and Zmax are stored using 24 bits each, and that the entire tile should be compressed down to 512 bits. If Zmin is equal to Zmax, then that equality may be used as a signal to interpret the remaining 512−24=488 bits in a different way. Only 24 is subtracted since 24 bits are gathered back from Zmin equals Zmax, which can be set to any value, as long as the Zmin-value is equal to the Zmax-value.

Note that this is just an example. Even more bits can be reclaimed by taking into account all the combinations that Zmin>=Zmax can be fulfilled, as well as all the redundant combinations in which the Zmin- and Zmax-ranges can overlap, as described previously.

One embodiment simply extends the residuals with the extra bit per sample that would otherwise be used to index whether the residual is relative to Zmin or Zmax.

Another embodiment spends the reclaimed bits on an alternative compression algorithm altogether. The bits may be used to encode a plane equation with per-pixel residuals, for example.

Even more unnecessary combinations can be found by taking the index mask into account. The index mask contains one bit per sample to select either Zmin or Zmax as the reference point for that sample. If all of the indices are 0 or if all of them are 1, then the Zmin or the Zmax value will not be used in compression/decompression, and is thus redundant. This means that the bits allocated for either Zmin or Zmax can be used for other purposes as well. If the redundant Zmin/Zmax-combinations described earlier are used, then the behavior of the index mask may be changed, and, thus, no further combinations are gained. For all of the valid Zmin/Zmax-combinations, however, the index mask redundancy can be used.

In one embodiment this is used to improve the representable range, while only having one interval, by detecting whether there are all 0's or all 1's in the index mask, and then utilize the unused bits of either Zmin or Zmax to improve the precision of the residual values.

The information from Zmin and Zmax may also be utilized to create a variant of DO. As an example, assume that a Zmin and Zmax value are stored as usual. Assume that 6 new Z-values are uniformly created by interpolation between Zmin and Zmax. Together with Zmin and Zmax, there are 8 values to choose from. Each 2×2 subtile then stores 3 bits to point into this palette of Z-values to identify a conservative Zmin-value, and another 3 bits to point to a conservative Zmax-value. The residuals are then computed relative to these new Zmin and Zmax-values per 2×2 subtile. This can be generalized to any tile/subtile sizes and to any number of interpolated depths in between Zmin and Zmax (as long as it sums to an even $2^n$).

It is also possible to gain another bit's worth of precision for Zmin or Zmax using the redundant combinations. For example, assume that Zmin has 16 bits precision and the target depth is 24. If Zmin>Zmax, then swap them, but also set the 17th bit of Zmin to 1. Otherwise, if Zmin<Zmax, set the 17th bit of Zmin to 0. This way the extra bit increases the precision of Zmin (or Zmax if desired).

Yet another way to exploit the extra bit from comparing Zmin against Zmax is the following. If Zmin>Zmax, then assume that the next W*H bits is a clear mask, which indicates whether a pixel is cleared or not, where W is the tile width and H is the tile height. If there are few non-cleared depths, then these can be stored in uncompressed form, and, otherwise, residuals are stored as described above, but only for the non-cleared pixels.

The discussion above has been with regard to depth, but the same approach applies to offset compression for color as well.

Taken together, the techniques above improve the original depth offset (DO) method in a number of different ways, and they increase the chances that DO succeeds at compressing a tile. This, in turn, may lead to reduced power consumption and/or increased performance.

Referring to FIG. 1, pixel pipelines 10 receive pixels from a rasterizer 11. The rasterizer identifies which pixels lie within a triangle currently being rendered. The rasterizater may operate on a tile of n×m pixels at a time. When the rasterizer finds a tile that partially overlap the triangle, it distributes the pixels in that tile over a number of pixel pipelines 10. Each pixel pipeline computes the depth and color of a pixel.

The pixel pipelines 10 supply depth values to a depth comparison unit 12. The depth comparison unit writes to a depth cache 14 and reads from the cache. On eviction, the depth cache sends depth data to a compressor 16 for compression and ultimate storage, as compressed, in the next level in the memory hierarchy 18. Information in that hierarchy may then be decompressed in decompressor 19 and supplied to the depth cache 14 so that it can be read by the depth comparison unit 12. While the depth cache 14 is illustrated as holding 6 tiles, other sizes of depth cache may be used.

Referring to FIGS. 2, 3, 4 and 5 the sequences set forth therein may be implemented in software, firmware and/or hardware. In software and firmware embodiments, they may be implemented by computer executed instructions stored in one or more non-transitory computer readable media, such as magnetic, optical, or semiconductor storages. In one embodiment, the compressor, shown in FIG. 1, may be processor-based and the storage may be in association with the compressor.

Figure 2:
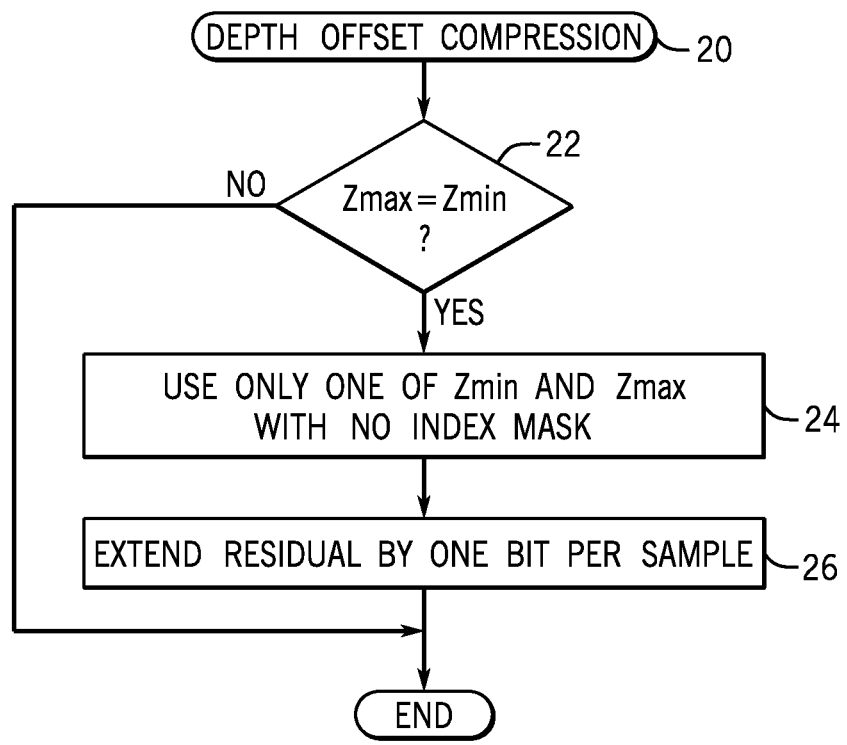
FIG. 2 is a flow chart for one embodiment.

The sequence 20 of FIG. 2 begins by determining whether Zmax is equal to Zmin, as indicated in diamond 22. If so, only one of Zmin and Zmax is used with no index mask, as indicated in block 24.

Then the residuals may be extended by one bit per sample, as indicated in block 26.

Figure 3:
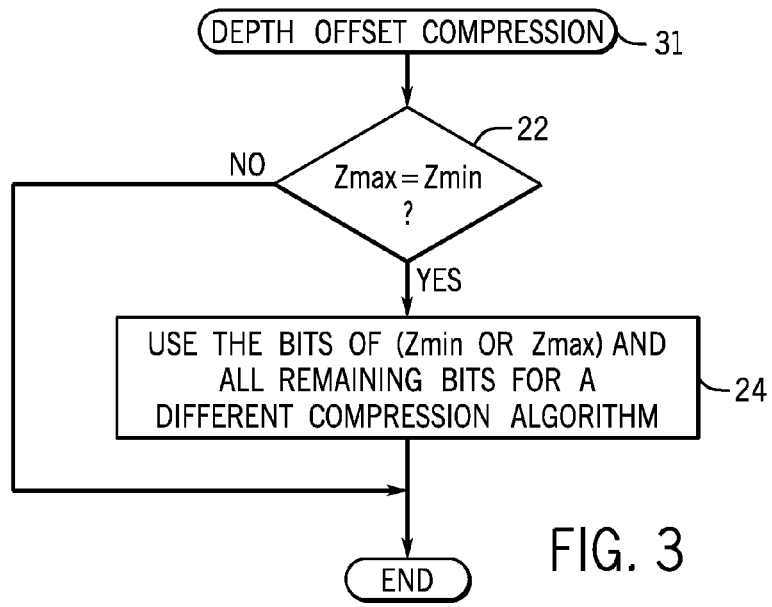
FIG. 3 is a flow chart for one embodiment.

Referring to FIG. 3, the sequence 31 may also use steps 22 and 24 in FIG. 2. As shown in block 30, use the bits of Zmin and all remaining bits for a different compression algorithm.

Figure 4:
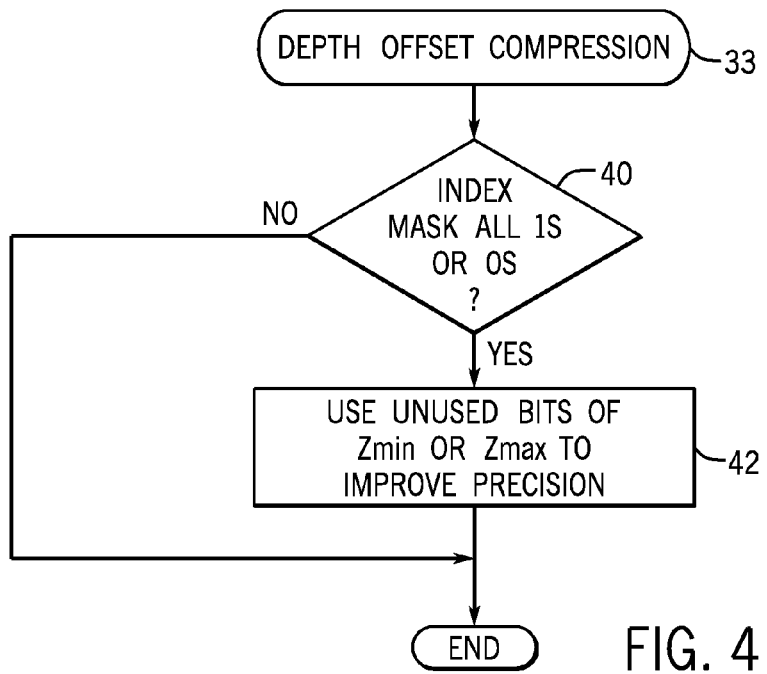
FIG. 4 is a flow chart for one embodiment.

In another case, represented in FIG. 4, it can be determined whether or not all of the index mask bits are either ones or zeros, as indicated in diamond 40. If so, you can use the unused bits of Zmin or Zmax to improve precision of Zmin or Zmax that is actually used, as indicated in block 42.

Figure 5:
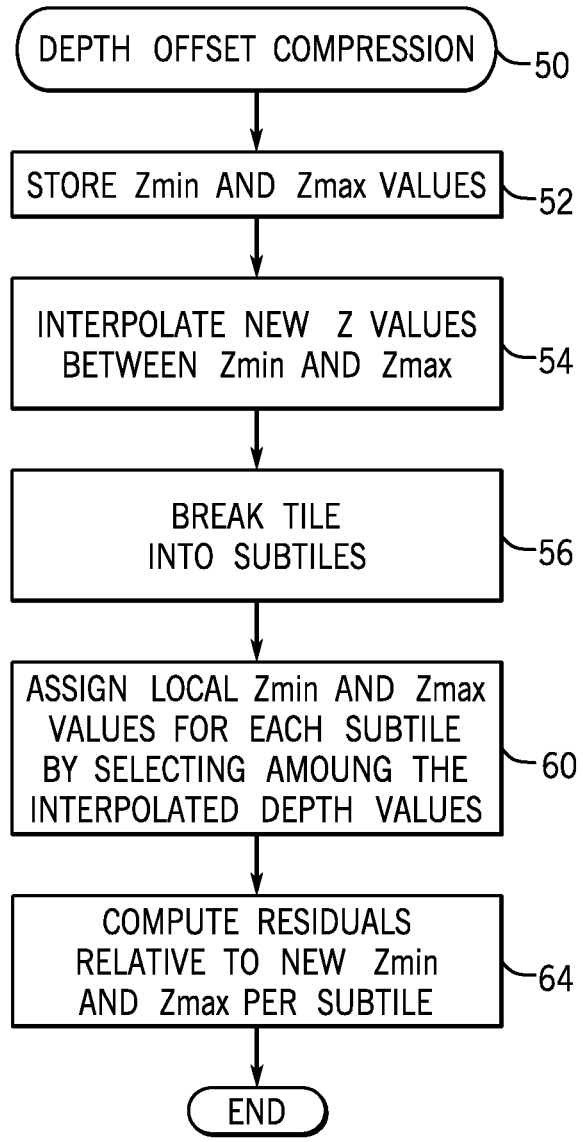
FIG. 5 is a flow chart for one embodiment.

Referring to the sequence 50 shown in FIG. 5, initially the Zmin and Zmax values are stored as indicated in block 52. Then new Z values may be interpolated (block 54) between the Zmin and the Zmax values. For example, six new Z values may be uniformly created by interpolation between Zmin and Zmax and then together with Zmin and Zmax there are eight values to choose from. In one embodiment, a tile may then be broken into 2×2 subtiles. In any case, a tile is broken into subtiles of the desired size as indicated in block 56. Assign local Zmin and Zmax values for each subtile by selecting among the interpolated depth values. Additional bits point to a conservative Zmax value. For example if a tile is broken into 2×2 subtiles, then each subtile stores three bits to point into the palette of Z values to identify a conservative Zmin value and another three bits point to a conservative Zmax value. The residuals are then computed relative to these new Zmin and Zmax values per subtile. Assign local Zmin and Zmax values for each subtile by selecting among the interpolated depth values as indicated in block 60. Then the residuals are computed relative to the new Zmin and Zmax values per subtile as indicated in block 64. Of course any subtile and tile sizes may be used with any number of interpolated depths between Zmin and Zmax as long as they sum to an even $2^n$.

The sequences of FIGS. 2-5 may be used separately or in combinations, in some embodiments.

Figure 6:
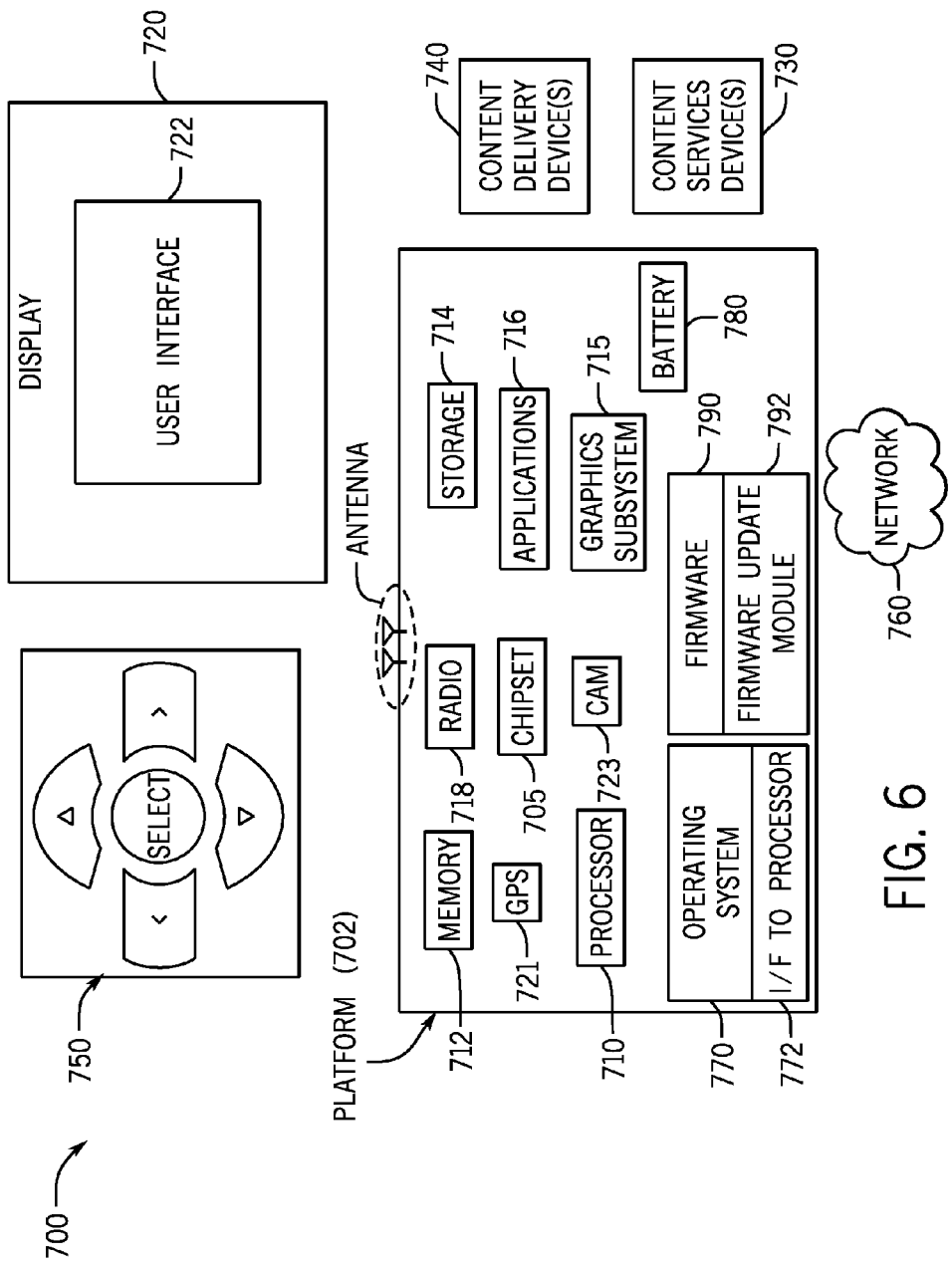
FIG. 6 is a system depiction for one embodiment.

FIG. 6 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIGS. 2-5 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
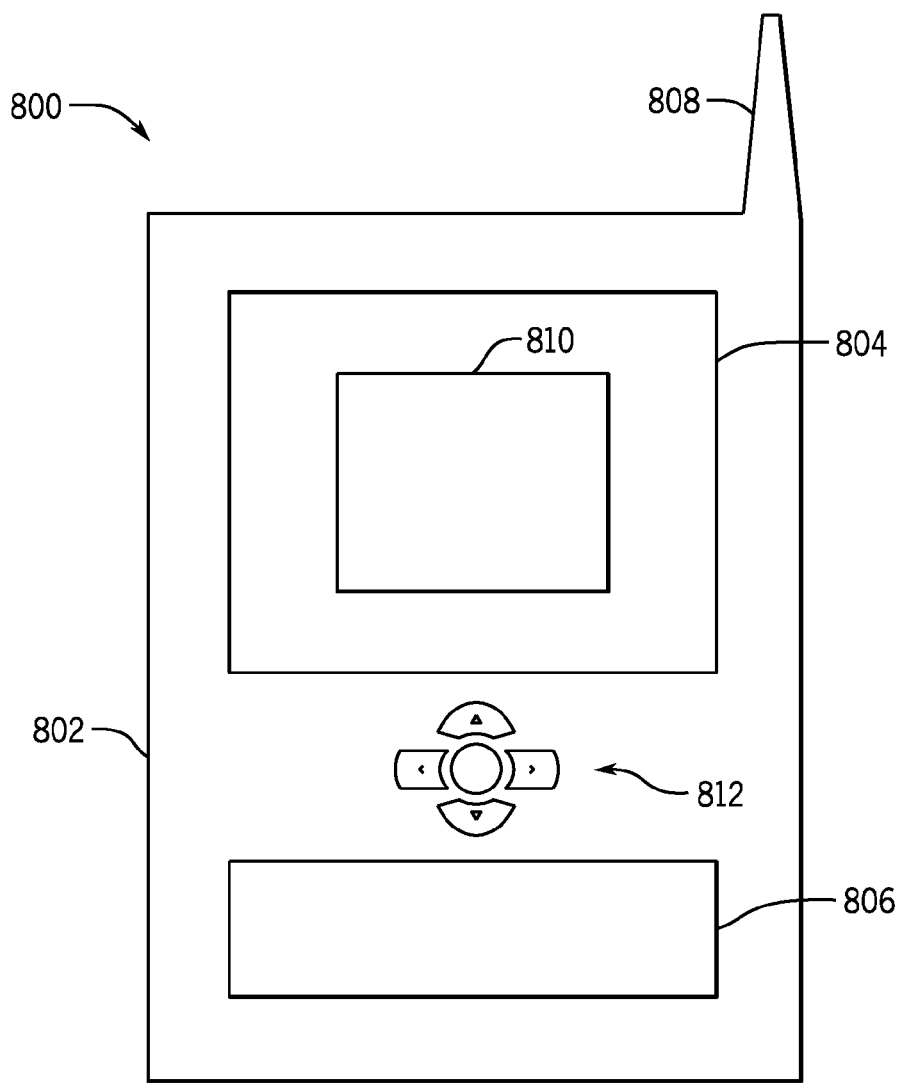
FIG. 7 is a front elevation for one embodiment.

As described above, system 700 may be embodied in varying physical styles or form factors. FIG. 7 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

The following clauses and/or examples pertain to further embodiments:

One example embodiment may be a method comprising determining, using a hardware processor, Zmin and Zmax for depth offset compression, determining whether Zmin is substantially equal to Zmax, and if so, only using one of Zmin and Zmax for depth offset compression and refraining from using an index mask. The method may include using bits saved by using only one of Zmin or Zmax to extend residuals with one bit per sample. The method may include using bits, saved by avoiding the need to specify whether residuals are with respect to Zmin or Zmax, to use a different compression algorithm. The method may include determining whether Zmin is greater than Zmax and, if so, swapping precisions of Zmin and Zmax and using an extra bit with Zmin. The method may include determining whether Zmin is less than Zmax and, if so, using an extra bit to indicate that Zmin is less than Zmax. The method may include detecting whether an index mask is all ones or zeros and, if so, using unused bits of Zmin or Zmax to improve precision of reference values that are actually used. The method may include if Zmin is less than Zmax, then using the next W×H bits as a clear mask to indicate whether the pixel is cleared or not, where W is a tile's width and H is a tile's height. The method may include storing depths in uncompressed form depending on how many non-cleared depths exist. The method may include determining more than two depth values per tile. The method may include breaking a tile into subtiles and assigning depth values to said subtiles, and selecting at least one subtile's depth value as a depth value of the tile.

Another example embodiment may be one or more non-transitory computer readable media storing instructions executed by a processor to perform a sequence comprising determining, using a hardware processor, Zmin and Zmax for depth offset compression, determining whether Zmin is substantially equal to Zmax; and if so, only using one of Zmin and Zmax for depth offset compression and refraining from using an index mask. The media may further store instructions to perform a sequence including using bits saved by using only one of Zmin or Zmax to extend residuals with one bit per sample. The media may further store instructions to perform a sequence including using bits, saved by avoiding the need to specify whether residuals are with respect to Zmin or Zmax, to use a different compression algorithm. The media may further store instructions to perform a sequence including determining whether Zmin is greater than Zmax and, if so, swapping precisions of Zmin and Zmax and using an extra bit with Zmin. The media may further store instructions to perform a sequence including determining whether Zmin is less than Zmax and, if so, using an extra bit to indicate that Zmin is less than Zmax. The media may further store instructions to perform a sequence including detecting whether an index mask is all ones or zeros and, if so, using unused bits of Zmin or Zmax to improve precision of reference values that are actually used. The media may further store instructions to perform a sequence including if Zmin is less than Zmax, then using the next W×H bits as a clear mask to indicate whether the pixel is cleared or not, where W is a tile's width and H is a tile's height. The media may further store instructions to perform a sequence including storing depths in uncompressed form depending on how many non-cleared depths exist. The media may further store instructions to perform a sequence including determining more than two depth values per tile. The media may further store instructions to perform a sequence including breaking a tile into subtiles and assigning depth values to said subtiles, and selecting at least one subtile's depth value as a depth value of the tile.

In another example embodiment may be an apparatus comprising a processor to determine, using a hardware processor, Zmin and Zmax for depth offset compression; determine whether Zmin is substantially equal to Zmax; and if so, only using one of Zmin and Zmax for depth offset compression and refraining from using an index mask, and a storage coupled to said processor. The apparatus may include said processor to use bits saved by using only one of Zmin or Zmax to extend residuals with one bit per sample. The apparatus may include said processor to use bits, saved by avoiding the need to specify whether residuals are with respect to Zmin or Zmax, to use a different compression algorithm. The apparatus may include said processor to determine whether Zmin is greater than Zmax and, if so, swapping precisions of Zmin and Zmax and using an extra bit with Zmin. The apparatus may include said processor to determine whether Zmin is less than Zmax and, if so, using an extra bit to indicate that Zmin is less than Zmax. The apparatus may include said processor to detect whether an index mask is all ones or zeros and, if so, using unused bits of Zmin or Zmax to improve precision of reference values that are actually used. The apparatus may include said processor to include, if Zmin is less than Zmax, then use the next W×H bits as a clear mask to indicate whether the pixel is cleared or not, where W is a tile's width and H is a tile's height. The apparatus may include said processor to store depths in uncompressed form depending on how many non-cleared depths exist. The apparatus may include said processor to determine more than two depth values per tile. The apparatus may include said processor to break a tile into subtiles and assigning depth values to said subtiles, and selecting at least one subtile's depth value as a depth value of the tile. The apparatus may include a display communicatively coupled to the processor. The apparatus may include a battery coupled to the processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
    determining, using a hardware processor, minimum depth (Zmin), and maximum depth (Zmax), residuals and Zmin/Zmax-index selection mask for depth offset compression;
    transforming unneeded bits allocated for one compression function to a different compression function; and
    detecting whether an index mask is all ones or zeros, and, if so, using unneeded bits of Zmin or Zmax to improve precision of the reference value or to redistribute the unneeded bits among the residuals.

2. The method of claim 1 determining ranges of Zmin and Zmax, determine Zmin and Zmax ranges that overlap, and identifying and reusing redundant bit combinations that arise from overlapping Zmin and Zmax ranges.

3. The method of claim 1 including identifying a Zmin/Zmax pair comprising a Zmin that is related to a Zmax, determining whether the Zmin/Zmax-pair constitutes a redundant combination or is an invalid reference value pair for depth offset compression, and if a Zmin/Zmax pair constitutes either a redundant combination or is an invalid reference value pair, using a different depth offset compression scheme, or a different compression algorithm altogether with the remaining bits.

4. The method of claim 3 including reusing the unneeded bits to extend residuals with one bit per sample.

5. The method of claim 1 including determining whether Zmin is greater than Zmax and, if so, swapping bits for Zmin with bits for Zmax and adding an extra bit to Zmin to improve precision of Zmin.

6. The method of claim 1 including, if Zmin is greater than Zmax, then using the next W by H bits as a clear mask to indicate whether the pixel is cleared or not, where W is a tile's width and H is a tile's height.

7. The method of claim 6 including, depending on how many non-cleared depths exist, storing depths in uncompressed form.

8. The method of claim 1 including for a tile being compressed, determining more than two depth values per tile.

9. The method of claim 8 including breaking a tile into subtiles and assigning one or more reference depth values to each of the said subtiles.

10. The method of claim 1 including transforming unneeded bits of color data allocated to one compression function to a different compression function.

11. One or more non-transitory computer readable media storing instructions executed by a processor to perform a sequence comprising:
    determining, using a hardware processor, minimum depth (Zmin) and maximum depth, (Zmax) for depth offset compression;
    determining residual bits per depth with respect to at least one of Zmin or Zmax that are unused for depth offset compression;
    transforming unneeded bits allocated for one compression function to a different compression function; and
    identifying a Zmin/Zmax pair comprising a Zmin that is related to a Zmax, determining whether Zmin is equal to Zmax, and if a Zmin/Zmax pair constitutes either a redundant combination or is an invalid reference value pair, using a different depth offset compression scheme, or a different compression algorithm altogether with the remaining bits.

12. The media of claim 11, determining ranges of Zmin and Zmax, determine Zmin and Zmax ranges that overlap, and said sequence including identifying and using redundant bit combinations that arise from overlapping Zmin and Zmax ranges.

13. The media of claim 11, said sequence including reusing the unneeded bits to extend residuals with one bit per sample.

14. The media of claim 11, said sequence including determining whether Zmin is greater than Zmax and, if so, swapping bits for Zmin with bits for Zmax and adding an extra bit to Zmin to improve precision of Zmin.

15. The media of claim 11, said sequence including, if Zmin is greater than Zmax, then using the next W by H bits as a clear mask to indicate whether the pixel is cleared or not, where W is a tile's width and H is a tile's height.

16. The media of claim 15, said sequence including, depending on how many non-cleared depths exist, storing depths in uncompressed form.

17. The media of claim 11, said sequence including detecting whether an index mask is all ones or zeros, and, if so, using unneeded bits of Zmin or Zmax to improve precision of reference values that, or to redistribute the unneeded bits among the residuals.

18. The media of claim 11, said sequence including for a tile being compressed, determining more than two depth values per tile.

19. The media of claim 18, said sequence including breaking a tile into subtiles and assigning depth values to each of said subtiles.

20. The media of claim 11 including transforming unneeded bits of color data allocated to one compression function to a different compression function.

21. An apparatus comprising:
determine, using a hardware processor, minimum depth (Zmin) and maximum depth (Zmax) for depth offset compression, determine residual bits per depth with respect to at least one of Zmin or Zmax that are unused for depth offset compression, transform unneeded bits allocated for one function compression to a different compression function, determine whether Zmin is greater than Zmax and, if so, swapping bits for Zmin with bits for Zmax and add an extra bit to Zmin to improve precision of Zmin; and
a storage coupled to said processor.

22. The apparatus of claim 21, said processor to determine ranges of Zmin and Zmax, determine Zmin and Zmax ranges that overlap, and identify and use redundant bit combinations that arise from overlapping Zmin and Zmax ranges.

23. The apparatus of claim 21, said processor to identify a Zmin/Zmax pair comprising a Zmin that is related to a Zmax, determine whether Zmin is equal to Zmax, and if a Zmin/Zmax pair constitutes either a redundant combination or is an invalid reference value pair, use a different depth offset compression scheme, or a different compression algorithm altogether with the remaining bits.

24. The apparatus of claim 21, said processor to reuse the unneeded bits to extend residuals with one bit per sample.

25. The apparatus of claim 21, said processor to, if Zmin is greater than Zmax, then using the next W by H bits as a clear mask to indicate whether the pixel is cleared or not, where W is a tile's width and H is a tile's height.

26. The apparatus of claim 21, said processor to depend on how many non-cleared depths exist, store depths in uncompressed form.

27. The apparatus of claim 21, said processor to detect whether an index mask is all ones or zeros, and, if so, use unneeded bits of Zmin or Zmax to improve precision of reference values that, or to redistribute the unneeded bits among the residuals.

28. An apparatus for depth testing comprising:
means for determining, using a hardware processor, minimum depth (Zmin), and maximum depth (Zmax), residuals and Zmin/Zmax-index selection mask for depth offset compression;
means for transforming unneeded bits allocated for one compression function to a different compression function;
means for detecting whether an index mask is all ones or zeros, and, if so, using unneeded bits of Zmin or Zmax to improve precision of the reference value or to redistribute the unneeded bits among the residuals; and
means for using the next W by H bits as a clear mask to indicate whether the pixel is cleared or not, where W is a tile's width and H is a tile's height if Zmin is greater than Zmax.

29. The apparatus of claim 28 including means for determining ranges of Zmin and Zmax, determine Zmin and Zmax ranges that overlap, and identifying and reusing redundant bit combinations that arise from overlapping Zmin and Zmax ranges.

30. The apparatus of claim 28 including means for identifying a Zmin/Zmax pair comprising a Zmin that is related to a Zmax, determining whether the Zmin/Zmax-pair constitutes a redundant combination or is an invalid reference value pair for depth offset compression, and if a Zmin/Zmax pair constitutes either a redundant combination or is an invalid reference value pair, using a different depth offset compression scheme, or a different compression algorithm altogether with the remaining bits.

31. The apparatus of claim 30 including means for reusing the unneeded bits to extend residuals with one bit per sample.

32. The apparatus of claim 28 including means for determining whether Zmin is greater than Zmax and, if so, swapping bits for Zmin with bits for Zmax and adding an extra bit to Zmin to improve precision of Zmin.

33. The apparatus of claim 28 including means for storing depths in uncompressed form depending on how many non-cleared depths exist.

34. The apparatus of claim 28 including means for detecting whether an index mask is all ones or zeros, and, if so, using unneeded bits of Zmin or Zmax to improve precision of the reference value or to redistribute the unneeded bits among the residuals.

35. The apparatus of claim 28 including for a tile being compressed, means for determining more than two depth values per tile.

36. The apparatus of claim 35 including means for breaking a tile into subtiles and assigning one or more reference depth values to each of the said subtiles.

37. The apparatus of claim 28 including means for transforming unneeded bits of color data allocated to one compression function to a different compression function.

\* \* \* \* \*